Patented Aug. 25, 1936

2,052,140

UNITED STATES PATENT OFFICE 2,052,140

FABRICATED STRUCTURE AND METHOD OF MAKING THE SAME

Herbert C. Jennison, Bridgeport, Conn., assignor to The American Brass Company, Waterbury, Conn., a corporation of Connecticut No Drawing. Application January 23, 1932, Serial No. 588,506

6 Claims. (Cl. 113—112)

This invention relates to a structure made from parts fabricated from an alloy which is particularly adapted for autogenous welding and to the method of making such a structure. This alloy may be used for making regular or irregular wrought shapes, such as extruded, rolled or drawn shapes, moldings, etc. for architectural work and the like. It also relates to shapes for these and similar purposes which can be readily welded at the joints, and to the structures produced therewith.

At the present time it is common to use alloys such as brass, for moldings, window frames, and similar shapes for architectural and like purposes which are ordinarily rolled, extruded or drawn, and at the joints they are ordinarily connected by soldering with a silver or similar solder, or riveted as it has been impossible to make satisfactory welds with these brass shapes. Welded joints are desirable as the soldered and riveted joints are not nearly as sightly or as strong as would be a satisfactory welded joint.

It is therefore an object of this invention to produce an alloy which can be readily worked and hot rolled, extruded or drawn into these shapes, and also cold rolled or drawn, and can be readily welded at the joints so as to do away with the necessity of soldering or riveting, and much better joints can be produced. It is also an object of the invention to produce an improved welded structure.

A further object is to provide an improved method of making the alloy.

I have found that by the addition of sufficient amounts of manganese and silicon to a copper-zinc alloy containing from about 50 percent to about 70 percent copper to produce a copper-zinc-manganese-silicon alloy the welding properties are tremendously increased; that the welds can be easily made, are dense and homogeneous, and can be ground off and polished; that the weld is practically indistinguishable from the remainder of the base metal; and also that the strength of the weld is practically the same as the base metal of the elements welded.

The preferred alloy comprises approximately 57.45 percent copper, 42 percent zinc, 0.50 percent manganese and 0.05 percent silicon. I have found that shapes made from this alloy can be readily welded and that the welds are strong, dense and uniform. I have also found that this alloy can be readily worked and readily hot rolled or extruded into irregular and regular shapes, and can also be cold rolled or drawn into various shapes. The material can be used for all architectural purposes, such as door fronts, building fronts, window frames, moldings, and similar work. These shapes made of this alloy are particularly adapted for buildings, architectural and similar purposes where it is desired that the joints be made by welding, especially autogenous welding. By autogenous welding I mean welding in which the metal of the weld is of substantially the same constituency or composition as the base metal of the members welded together whether or not additional metal is added from a welding or filler rod, and whether the welding is done with a gas or blow torch, by electric arc or other source of heat.

It has been found that in this copper-zinc-manganese-silicon alloy the welding properties have been increased tremendously over the copper-zinc alloy. The weld has a tensile strength almost equal to that of the base metal, and the weld is also very sound and homogeneous, and the metal welds readily so that the joints can be readily and easily made. The manganese reduces the volatilization of the zinc in the base metal during the welding operation so that the composition at the weld is not materially changed, and it does not choke the welder during the welding. If the manganese were not present the loss of zinc would be very high, especially in making autogenous welds.

The addition of the silicon adds to the hot workability without rendering the metal brittle when cold. It also increases the strength of the material, and particularly increases the autogenous welding properties. While manganese is effective in suppressing or reducing the volatilization of the zinc during the welding operation I believe silicon is even more effective for this purpose, as I have found in welding members formed of this alloy the zinc fumes are greatly suppressed and therefore as the loss of zinc is greatly reduced the metal of the finished weld is of substantially the same constituency or composition as the base metal of the members welded. After the weld has been made, ground and polished it is practically impossible to detect it.

Although an alloy having approximately the above noted proportions has proven very satisfactory as having improved properties for welding and improved workability, I am not limited thereto as the proportions of the various metals may be varied considerably without losing this adaptability for welding and working. The amount of manganese is preferably below 1.00 percent and from about 0.10 percent up to about 1.00 percent. The silicon is preferably approximately 0.05 percent. However, the copper may vary from about 50 percent to about 70 percent, the manganese from about 0.01 percent to about 5 percent, the silicon from about 0.01 percent to 0.25 percent, and the balance zinc, although with the higher percentages of manganese the alloy may not work quite as readily.

This alloy is also very adaptable for use as a welding rod for welding other metals as well as this particular alloy. The welding properties of this alloy are not materially changed by the additions of small amount of other elements, and therefore the additions of small amounts of these elements would not materially change the adaptability of this alloy for the purposes intended.

In short this alloy works readily and makes a strong, dense, homogeneous and very beautiful weld. It also welds easily and does not choke the men during the welding operation.

The preferred method for making this alloy is to introduce the manganese and silicon by means of a master alloy. The preferred composition of this master alloy is approximately 67 percent copper, 30 percent manganese, and 3 percent silicon. Although this is the preferred composition the manganese in the master alloy may vary from 5 percent to 50 percent, the silicon from 0.1 percent to 7.5 percent, and the balance copper.

This master alloy is first carefully prepared, and is then used according to its composition for introducing the manganese and silicon into the ultimate alloy in carefully controlled amounts to give the desired proportions as above specified. By using this master alloy the manganese and silicon in the main or ultimate alloy can be controlled within much narrower limits than if these two elements were added directly to the molten metal. This master alloy may be added to molten copper in proper proportions and followed by zinc in proper proportions to give the desired alloy as above described; or the master alloy may be added to a molten alloy of copper and zinc in the proper proportions to give the desired proportions in the finished alloy; or if preferred the master alloy may be added in proper amounts to molten copper, zinc, manganese, and silicon in proper proportions. That is, for example, some scrap of the copper-zinc-manganese-silicon alloy can be added to molten new copper and the new zinc, and then the required amount of the master alloy can be added to give the proportions of the various elements desired in the finished or ultimate alloy as above described.

Having thus set forth the nature of my invention, what I claim is:

1. A fabricated structure comprising a plurality of members composed of an alloy of from 50% to 70% copper, from 0.01% to 5% manganese, from 0.01% to 0.25% silicon, and the balance zinc worked into shaped members, and welded together to form the structure, the metal of the welds being of substantially the same constituency as the base metal of the welded members.

2. A fabricated structure comprising a plurality of members composed of an alloy or from 50% to 70% copper, from 0.01% to 1% manganese, from 0.01% to 0.25% silicon and balance zinc worked into shaped members, and welded together to form the structure, the metal of the welds being of substantially the same constituency as the base metal of the welded members.

3. A fabricated structure comprising a plurality of members composed of an alloy of approximately 57.45% copper, 42% zinc, 0.50% manganese, and 0.05% silicon worked into shaped members and welded together to form the structure, the metal of the welds being of substantially the same constituency as the base metal of the welded members.

4. A method of making a fabricated structure comprising working an alloy composed of from 50% to 70% copper, from 0.01% to 5% manganese, from 0.01% to 0.25% silicon, and the balance zinc, and forming the worked alloy into shaped members, placing the members adjacent each other, and welding the adjacent members together by autogenous welding of the adjacent surfaces so that the metal of the welds is of substantially the same constituency as the base metal of the welded members.

5. A method of making a fabricated structure comprising working an alloy composed of from 50% to 70% copper, from 0.01% to 1.00% manganese, from 0.01% to 0.25% silicon and balance zinc, and forming the worked alloy into shaped members, placing the members adjacent each other, and welding the adjacent members together by autogenous welding of the adjacent surfaces so that the metal of the welds is of substantially the same constituency as the base metal of the welded members.

6. A method of making a fabricated structure comprising working an alloy composed of approximately 57.45% copper, 42% zinc, 0.5% manganese, and 0.05% silicon, and forming the worked alloy into shaped members, placing the members adjacent each other, and welding the adjacent members together by autogenous welding of the adjacent surfaces so that the metal of the welds is of substantially the same constituency as the base metal of the welded members.

HERBERT C. JENNISON.